United States Patent [19]

Iwamoto et al.

[11] Patent Number: 5,744,533
[45] Date of Patent: Apr. 28, 1998

[54] ADHESIVE COMPOSITION FOR BONDING A SEMICONDUCTOR DEVICE

[75] Inventors: Nancy E. Iwamoto, Ramona; Jesse L. Pedigo, La Mesa; Shao Wei Li; Alan Grieve, both of San Diego, all of Calif.

[73] Assignee: Johnson Matthey, Inc., Valley Forge, Pa.

[21] Appl. No.: 868,508

[22] Filed: Jun. 4, 1997

[51] Int. Cl.⁶ ........................................ C08K 3/00
[52] U.S. Cl. ............................... 524/440; 524/439
[58] Field of Search ........................... 524/440, 439

[56] References Cited

U.S. PATENT DOCUMENTS 5,358,992 10/1994 Dershem et al. ................. 524/439
5,475,048 12/1995 Jamison et al. .................. 524/439
5,498,372 3/1996 Hedges ............................ 252/511
5,612,403 3/1997 Nguyen et al. ................... 524/440

*Primary Examiner*—Edward J. Cain
*Attorney, Agent, or Firm*—Christie, Parker & Hale, LLP

[57] ABSTRACT

Described is an adhesive composition suitable for bonding a semiconductor device to a substrate comprising about 60–90 wt. % particulate silver; about 10–40 wt. % of an adhesive material comprising at least one nonelectrically conductive organic compound; and a filler comprising at least one electrically conductive organic compound capable of forming a conductivity bridge between silver particles. The adhesive composition may additionally include at least one curing catalyst for the adhesive material, a flexibilizer to render the composition more flexible, a surfactant to facilitate contact with a substrate and/or a material to aid in adjusting the rheology of the composition.

18 Claims, No Drawings

ADHESIVE COMPOSITION FOR BONDING A SEMICONDUCTOR DEVICE

BACKGROUND OF THE INVENTION

The present invention is directed to adhesive compositions suitable for bonding a semiconductor device to a substrate. More particularly, the invention involves polymer-based die attach formulations useful for bonding a semiconductor device to flexible and laminate substrates.

Polymer-based die attach adhesives have been used with advantage to bond semiconductor devices to substrates in a variety of applications. The adhesive composition component of such formulations are nonelectrically conductive but are combined with electrically conductive fillers, such as silver, when an electrically conductive die attach adhesive is desired.

Electrically conductive polymers may be used in place of silver, however, although available, such conductive polymers by themselves do not present a conductivity advantage compared to silver and pure conductive polymers are normally unstable at process temperatures used for curing and solder reflow.

Electrically conductive polymeric compositions, although available, do not present a conductivity advantage compared to silver. Moreover, thermal instability inherent in conductive polymers suggest that they are not suitable for die attach adhesive formulations which generally require heating to elevated temperatures to cure the adhesive component.

SUMMARY OF THE INVENTION

The present invention is directed to an adhesive composition suitable for bonding a semiconductor device to a substrate comprising about 60–90 wt. % particulate silver; about 10–40 wt. % of an adhesive material comprising at least one nonelectrically conductive organic compound; and a filler comprising at least one electrically conductive organic compound capable of forming a conductivity bridge between silver particles, or functionally equivalent materials, unless otherwise indicated herein. The term particulate silver refers to powder or flake. The terms "electrically conductive organic compound" or "electrically conductive filler" are used throughout the present specification to refer to any electrically conductive polymer or any electrically conductive polymer composition. The adhesive composition may additionally include at least one curing catalyst for the adhesive material, a flexibilizer to render the composition more flexible, a surfactant to facilitate contact with a substrate and/or a material to aid in adjusting the rheology of the composition.

The electrically conductive filler advantageously comprises a conductive polymer compound which is present in an amount up to about 5 wt. % of the total adhesive formulation. Suitable electrically conductive fillers include the conductive polymers polyaniline, polypyrrole and composites of the conductive polymers on carbon, silicon, aluminum nitride, boron nitride, silicon carbide, etc. supports. The composite form of the electrically conductive filler is desirable because of its enhanced thermal stability over the pure form of the conductive polymer. Therefore, thermal treatments of the adhesive (such as curing, annealing, solder reflow, etc.) will not affect the electrical performance of the formulation.

DETAILED DESCRIPTION

As contemplated herein, the adhesive composition with an electrically conductive filler is especially useful for bonding semiconductor devices to plastic and flexible substrates where improved electrical conductivity is desirable.

According to the invention electrically conductive polymers are included in the adhesive composition because, though they do not present a conductivity advantage compared to silver, they provide an additional organic filler with conductivity greater than the typical fillers used in die attached adhesives, such as silica, clays, alumina, or ceramic materials normally used to control rheology. The electrically conductive fillers also have the advantage of allowing a greater opportunity for a conductivity bridge to form between the silver particles in the adhesive formulation as well as between silver and electrode interfaces. Furthermore, compositions in accordance with the invention can be formulated to enable the adhesive to be cured at temperatures as high as 200° C. with exhibited temperature stability as high as 300° C.

In addition to the forgoing, these electrically conductive fillers are compatible with the resin component of the adhesive. Such polymers have better wetting properties with the monomeric binders than the common inorganic fillers such as silica, clays, alumina, silver, and other ceramic-based fillers. Conductive polymers generally do not have as high conductivity as pure silver (0.03125 vs. 0.00000159 ohms-cm resistivity) and as such, do not serve as a good alternative to silver. However the conductive polymers are much more conductive than insulating materials such as the polymer binding materials (including cyanate esters, epoxies, acrylates, polyolefins, polycyloxanes, urethanes, etc.) and inorganic fillers such as silicon oxide and aluminum oxide which have resistivities of $1 \times 10^{21}$ and $1 \times 10^{22}$ ohm-cm, respectively. Another feature of these material is that they are compatible with the organic-based vehicle or binder in the adhesive formulation and as such appear to maintain suspension in the resin matrix without settling like other fillers such as silver. This suspended nature enhances the probability of formation of conductive bridges mentioned previously and also helps to also maintain suspension of the silver. It has been found that by replacing nonelectrically conductive fillers with a conductive polymer, such as polyaniline and polypyrrole, the conductivity increases at least 10 to 100 times over the conventional silver-filled formulation. In addition, since the surface area of the conductive polymer is much higher than that of the typical particulate silver, powder or flake, filler (about 300 $m^2/g$ for the conductive polymer vs. about 0.4 $m^2/g$ for silver), even when used in small quantities the conductive polymer acts to modulate the rheology of the paste as well as increase the conductivity of a paste formed of the adhesive composition. Graphite particles or fibers may also be used as a conductivity enhancement filler, but graphite's extremely high porous nature and high surface area (greater than 1000 $m^2/g$) creates viscosity problems and problems of compatibility with the polymer binders, even in low quantities, and therefore make it less desirable than the conductive polymer fillers used in the composition of the invention. In addition, they may not offer the same suspension stabilizing affect as the conductive polymer fillers. Another advantage of the adhesive composition described is that the conductive polymer appears to help decrease the resin bleed when added to replace up to about 1% silver in the composition.

To illustrate the adhesive composition, several formulations were prepared as described in Table 1. These formulations include particulate silver, e.g. flake, cyanate ester as the adhesive material component, a quaternary ammonium surfactant, "Armak", two monomeric adhesive materials, trimethylopropanetriacrylate, and tetraethyleneglycoldiacrylate, 2,2'-azobisisobutyronitrile (AIBN) catalyst, an accelerant for curing cyanate ester, nonylphenol, a rheology adjusting agent silica, and a commercially available conductive polymer Eeonomer P20-6 F. The surfactant Armak 1363 is available from Akzochemie America, Deer Park, Tex.; Ancamine 2014 as is available from Pacific Anchor, Allentown, Pa. and the conductive filler Eeonomer is available from Eeonyx, Pinole, Calif. and is based upon either a polyaniline or polypyrrole coating on a carbon core. The cyanate ester is Arocy L10 from Ciba/Geigy.

TABLE 1

| Paste ID # | Sample No. | | |
|---|---|---|---|
| | 061196.3 Wt. % | 061196.4 Wt. % | Control Wt. % |
| A. Silver Flake | 74.34 | 74.47 | 75 |
| B. Cyanate Ester (Ciba/Geigy L-10) | 12.92 | 12.94 | 12.9 |
| C. Armak (quaternary ammonium surfactant) | 0.2 | 0.2 | 0.2 |
| D. Ancamine (polyamine) | 3.37 | 3.41 | 3.4 |
| E. Trimethylolpropane Triacrylate | 3.51 | 3.51 | 3.5 |
| F. Tetraethyleneglycol Diacrylate | 3.5 | 3.51 | 3.5 |
| G. AIBN,2,2'-azobisisobutyronitrile | 0.2 | 0.2 | 0.2 |
| H. Nonylphenol | 1 | 1 | 1 |
| I. Silica | 0.2 | 0 | 0.2 |
| J. Eeonomer (Conductive Polymer Filler) | 0.75 | 0.75 | 0 |

It has been determined that the conductive filler has the most profound effect as a replacement for conventional silica fillers used for rheological control. It has also been found that rheology, bleed and conductivity are all controllable to some extent by using the conductive polymer filler.

Volume resistivity for these samples are shown in Table 2. Three replicate specimens were prepared on glass glides by masking off a strip measuring 0.1" wide by approximately 3"long and 1.2 mil thick. All test strips were made by doctor-blading, then cured at 175° C. for 2 hours. The test slides were initially measured for resistance on a Keithley 4 point probe station, followed by a comparison of multi-positioned (at 2.54 cm) kelvin probes, using a Valhalla resistance meter.

TABLE 2

| Sample ID # | Conductive Polymer Type | Volume Resistivity ohms-cm (Keithley) | Volume Resistivity ohms-cm (Valhalla) |
|---|---|---|---|
| 061196.3 | Polyaniline | 0.005099 | 0.000961 |
| 061196.4 | Polyaniline | 0.00131 | 0.0000998 |
| Control | none | 0.097578 | 0.0154 |

Since the density of the conductive polymer filler is very low (about 0.062 g/cm$^3$), it is believed that keeping the filler dispersed within the formulation in this composition is easier than a similar sized metal powder which would have a tendency to settle. It is hypothesized therefore that the dispersed conductive polymer filler acts as a conductive bridge between silver. In addition, we have observed the dispersion enhancement when formulating with the conductive polymer filler with silver filled compositions. Because of this dispersion enhancement quality surface contact between the paste and test electrodes is further enhanced.

This is especially important when considering the effect of the binder as the higher the insulating effect of the binder on the silver, the greater the need for a co-compatible particle that can break through the insulative layer as well as act as the conductive bridge. Conductive polymers, due to their organic nature can serve that function. Attempts at dissolving the conductive polymer filler resulted in no improvement in conductivity in these formulations.

Other examples of the invention are shown below. Three additional series of formulations were made as described in Tables 3, 4 and 5. Compositions in Table 3 were made from production samples of a die attach formulation "JM 2000" available from Johnson Matthey, Inc., San Diego, Calif.; Table 4 describes formulations of cyanate ester and epoxy and Table 4 describes formulations of cyanate ester and a second epoxy. Components A through J where used in Tables 3, 4 and 5 correspond to materials labels A through J in Table 1.

TABLE 3

| Paste ID # | | A | B | C | D | E | F | G | H | I | J |
|---|---|---|---|---|---|---|---|---|---|---|---|
| 1473-60 | (%) | 75 | 12.9 | 0.2 | 3.4 | 3.5 | 3.5 | 0.2 | 1.0 | 0.2 | 0 |
| 1473-60A | (%) | 74.25 | 12.9 | 0.2 | 3.4 | 3.5 | 3.5 | 0.2 | 1.0 | 0.2 | 0.75 |

TABLE 4

| Paste ID # | | A | B | BisF Epoxy | Copper Acetylacetonate | J |
|---|---|---|---|---|---|---|
| XO2244 | % | 75 | 13.7 | 11.24 | 0.06 | 0 |
| XO2246 | % | 74.65 | 13.489 | 11.059 | 0.062 | 0.74 |

TABLE 5

| Paste ID # | | B | BisA Epoxy | BisF Epoxy | HT 939 | C | A187 | A | J |
|---|---|---|---|---|---|---|---|---|---|
| XO2243 | % | 6.075 | 7.6 | 7.6 | 3.425 | 0.125 | 0.15 | 75.0 | 0 |
| XO2245 | % | 6.081 | 7.608 | 7.608 | 3.428 | 0.125 | 0.15 | 74.25 | 0.75 |
| 1473-78A | % | 6.081 | 7.608 | 7.608 | 3.428 | 0.125 | 0.15 | 74.25 | 0.75 |

HT939 = a polyamide from CIBA/GEIGY
A187 = an epoxy silane coupling agent from Witco, Osi Specialities Group (Eudicott, NY)
Armak = quaternary ammonium surfactant from Akzo Chemicals (Chicago, Ill)
Note: All conductive polymers obtained from Eeonyx (Pinole, CA) and have a carbon core structure Volume resistivity was measured and shown in Table 6. An even greater enhancement of conductivity was observed in the production sample, which may reflect differences in manufacturing processes from those samples in Tables 1 to 2.

TABLE 6

| Sample # | Resin Type | Conductive Polymer Type | Volume Resistivity (Keithley) | Volume Resistivity (Valhalla) |
|---|---|---|---|---|
| 1473-60 | JM2000 | None | 35900 ohm-cm | 52700 ohm-cm |
| 1473-60A | JM2000 | Polyaniline | 0.019 | 0.0186 |
| XO2243 | CE/Epoxy B | None | off-scale | off-scale |
| XO2245 | CE/Epoxy B | Polyaniline | 69 | 74 |
| 1473-78A | CE/Epoxy B | Polypyrrole | 20.7 | 23.7 |

Back-side resistance was measured using a gold lid (500 mil×500 mil) attached to a gold coated ceramic substrate or gold like substrate using a bondline of the adhesive or approximately 0.5 to 1.0 mi. The adhesive is cured and conductivity tested using the two gold surfaces as the electrodes. The results are reported in Table 7 and Table 8. In Table 7 a 30 minute cure was used and in Table 8 a 120 minute cure was used. The Simpson is another resistance meter which is a more sensitive instrument than either the Keithley or Valhalla.

TABLE 7

| Sample # | Resin Type | Conductive Polymer Type | Resistance (Simpson) OHMS | Resistance (Valhalla) OHMS |
|---|---|---|---|---|
| 1473-60 | JM2000 | None | 0.047–1.15 | — |
| 1473-60A | JM2000 | Polyaniline | 0.0119–0.0697 | — |
| XO2244 | CE/Epoxy A | None | off-scale | $40 \times 10^6$ |
| XO2246 | CE/Epoxy A | Polyaniline | off-scale | $0.1 \times 10^6$ |
| XO2243 | CE/Epoxy B | None | 10.9–12.0 | 11.7–13.4 |
| XO2245 | CE/Epoxy B | Polyaniline | 1.19–2.00 | 1.15–1.95 |
| 1473-78A | CE/Epoxy B | Polypyrrole | 3.71–5.14 | — |

TABLE 8

| Sample # | Resin Type | Conductive Polymer Type | Resistance (Simpson) OHMS | Resistance (Valhalla) OHMS Range |
|---|---|---|---|---|
| 1473-60 | JM2000 | None | 0.075–2.3 | — |
| 1473-60A | JM2000 | Polyaniline | 0.014–0.062 | — |
| XO2244 | CE/Epoxy A | None | off-scale | off-scale |
| XO2246 | CE/Epoxy A | Polyaniline | off-scale | $0.72–1.9 \times 10^5$ |
| XO2243 | CE/Epoxy B | None | 7.7–10.3 | 8.9–10.9 |
| XO2245 | CE/Epoxy B | Polyaniline | 3.2–5.3 | 3.1–5.3 |
| 1473-78A | CE/Epoxy B | Poiypyrrole | 2.0–6.1 | — |

It is apparent from the forgoing that various changes in modifications may be made without departing from the invention. Accordingly, the scope of the invention should be limited only by the appended claims, wherein what is claimed is:

What is claimed is:

1. An adhesive composition suitable for bonding a semiconductor device to a substrate comprising about 60 to 90 wt. % particulate silver;
    about 10 to 40 wt. % of an adhesive material comprising at least one nonelectrically conductive organic compound; and
    a filler comprising at least one electrically conductive organic compound, said filler forming a conductivity bridge between silver particles.

2. An adhesive composition according to claim 1 wherein said filler comprises at least one electrically conductive organic polymer compound, said filler acting as a suspension stabilizer for the silver particles or other fillers.

3. An adhesive composition according to claim 1 wherein said adhesive material comprises a polymerizable organic compound.

4. An adhesive composition according to claim 2 wherein said adhesive material comprises a cyanate ester-forming monomer.

5. An adhesive composition according to claim 1 wherein said filler comprises a polymerizable organic compound.

6. An adhesive composition according to claim 1 containing up to about 5 wt. % filler.

7. An adhesive composition according to claim 1 containing about 0.5 to 1 wt. % filler.

8. An adhesive composition according to claim 7 further comprising a curing catalyst for said adhesive material comprising at least one of alkylphenol, metal curing catalyst and organic curing catalyst.

9. An adhesive composition according to claim 1 further comprising at least one curing catalyst for said adhesive material.

10. An adhesive composition according to claim 1 further comprising at least one flexibilizer.

11. An adhesive composition according to claim 1 wherein said adhesive material comprises a plurality of polymerizable monomers.

12. An adhesive composition according to claim 1 further comprising at least one surfactant.

13. An adhesive composition according to claim 1 further comprising a material to aid in adjusting the rheology of the composition.

14. An adhesive composition according to claim 1 further comprising an anti-bleed agent.

15. An adhesive composition according to claim 1 wherein electrical contact with surface electrodes said electrically conductive organic-based filler provides a conductivity bridge between surface electrodes and the particulate silver contained in the adhesive formulation.

16. An adhesive composition suitable for bonding a semiconductor device to a substrate comprising:

particulate silver in an amount up to about 90 wt. %;

about 10 to 40 wt. % of an adhesive material comprising at least one nonelectrically conductive organic compound;

a filler comprising at least one electrically conductive organic-based compound, said filler forming a conductivity bridge between silver particles;

at least one curing catalyst for said adhesive material;

at least one flexibilizer;

a material to aid in adjusting the rheology of the adhesive composition; and an anti-bleed agent.

17. An adhesive composition according to claim 14 containing about 60 to 90 wt. % silver and less than about 5 wt. % electrically conductive organic-based filler.

18. An adhesive composition according to claim 14 wherein said curing catalyst comprises at least one of alkylphenol, a metal curing catalyst and an organic curing catalyst.

\* \* \* \* \*